April 11, 1961 C. H. HESS 2,979,137
TRACTOR-PICKUP HITCH
Filed March 17, 1958 3 Sheets-Sheet 2
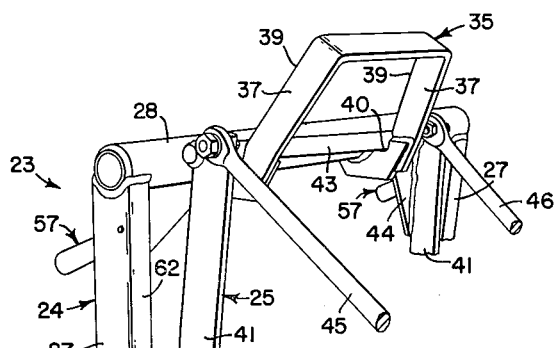
FIG. 2
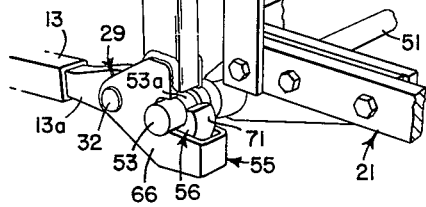
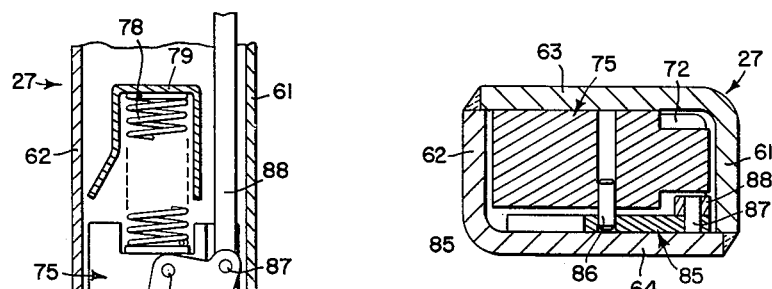
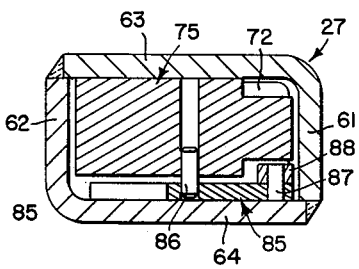
FIG. 5
FIG. 6
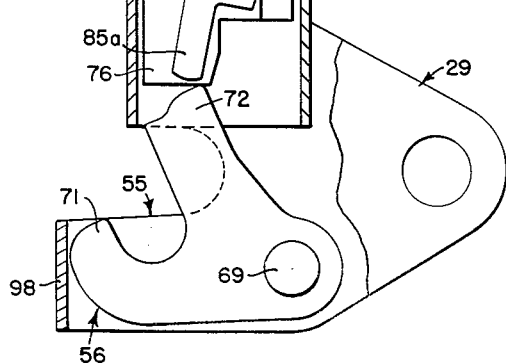
INVENTOR.
CHRISTIAN H. HESS
BY
ATTORNEYS

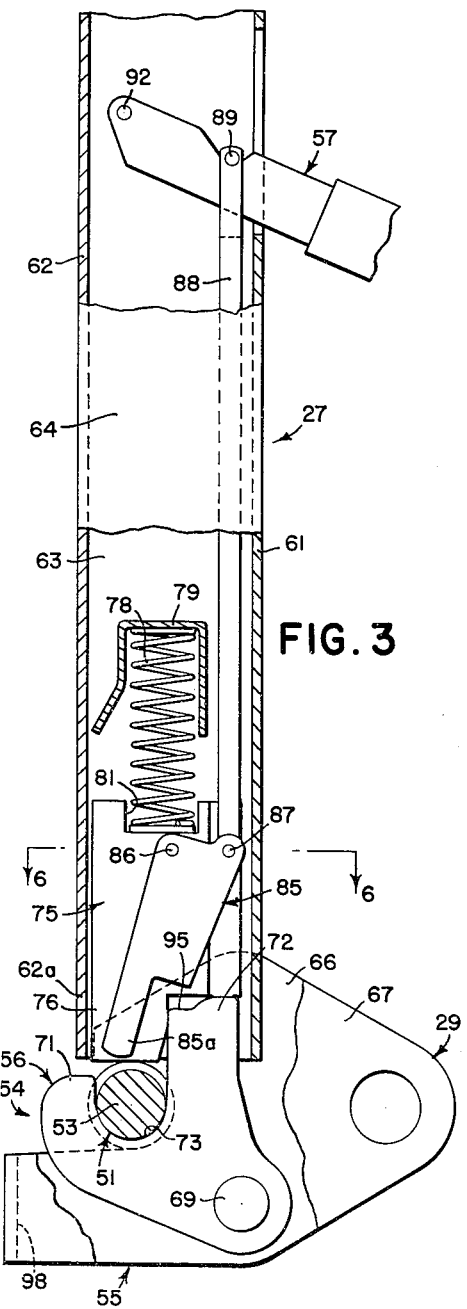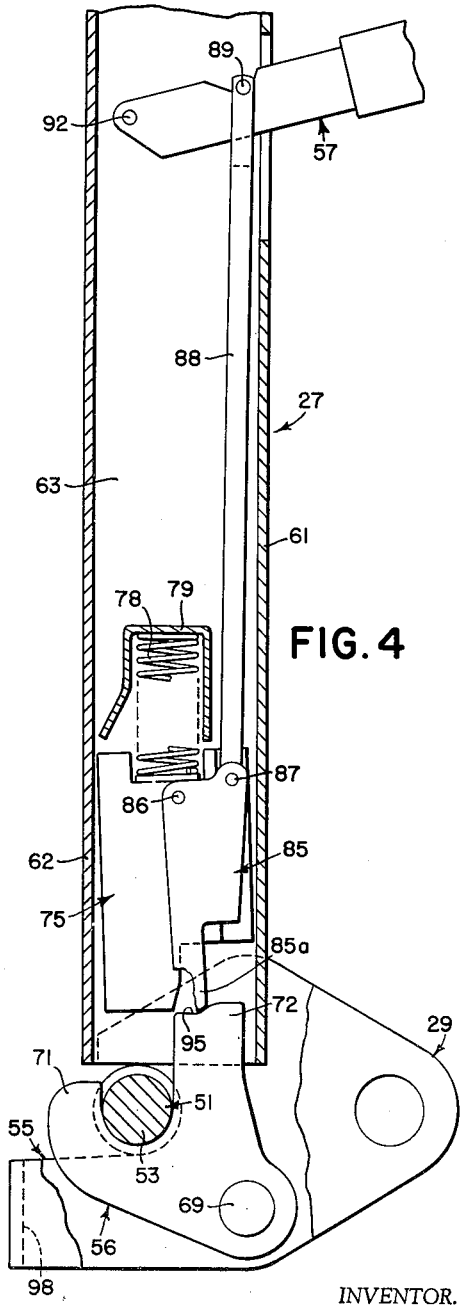

United States Patent Office 2,979,137
Patented Apr. 11, 1961

2,979,137

TRACTOR-PICKUP HITCH

Christian H. Hess, Waterloo, Iowa, assignor, by mesne assignments, to Deere & Company, a corporation of Delaware Filed Mar. 17, 1958, Ser. No. 721,858

12 Claims. (Cl. 172—272)

The present invention relates generally to tractor mounted implements and more particularly to implements that are adapted to be connected to tractors having the Ferguson type three point hitch, in which the tractor carries upper and lower vertically and laterally swingable hitch links, the rear ends of which are adapted to be connected with any one of a number of different available implements, and in which power means is provided for raising and lowering the links to raise and lower the implements.

The object and general nature of this invention is the provision of new and improved hitch means whereby the connecting and disconnecting of the implement may easily and quickly be accomplished with a minimum expenditure of time and effort, while the operator remains on the seat of the tractor. More specifically, it is a feature of this invention to provide means whereby the tractor may be backed into operative relation with the implement and the draft links operated to raise the implement, which automatically effects a draft-transmitting connection that does not require any remote or extraneous power operated cylinder or any excessive maneuvering of the tractor and/or implement.

More specifically, it is a feature of this invention to provide a hitch means of the character described, wherein means in the nature of a hitch structure or frame is carried by the tractor links to be raised and lowered by operation of the links, with interengaging means on the hitch frame and the implement whereby the upper portion of the hitch structure may be hooked into engagement with the upper forward portion of the implement, whereupon raising the tractor draft links then effects an automatic relative movement between the implement and the hitch frame and an automatic latching of the implement to the hitch frame in draft transmitting relation, after which the implement, so connected, may either be further raised into a transport position, or lowered into an operating position, by only the usual raising or lowering of the tractor draft links by operation of the conventional controls on the tractor effected from the operator's station on the tractor.

These and other objects and advantages of the present invention will be apparent to those skilled in the art after a consideration of the following detailed description, taken in conjunction with the accompanying drawings, in which:

Fig. 2 is a fragmentary perspective view similar to Fig. 1 but showing the hitch mechanism in its fully engaged draft-transmitting position.

Fig. 3 is a detail view of the latch mechanism, showing the latter in the completely latched position, certain parts being broken away for purposes of clarity.

Fig. 4 is a view similar to Fig. 3, showing the latch parts in the positions they occupy when the implement is to be released from the tractor-carried draft frame.

Fig. 5 is a view similar to Fig. 4 showing the latch parts in the positions they occupy after the implement has been released and in which the latch parts are conditioned to permit automatic reconnection of the implement.

Fig. 6 is an enlarged section taken along the line 6—6 of Fig. 3.

Figure 1:
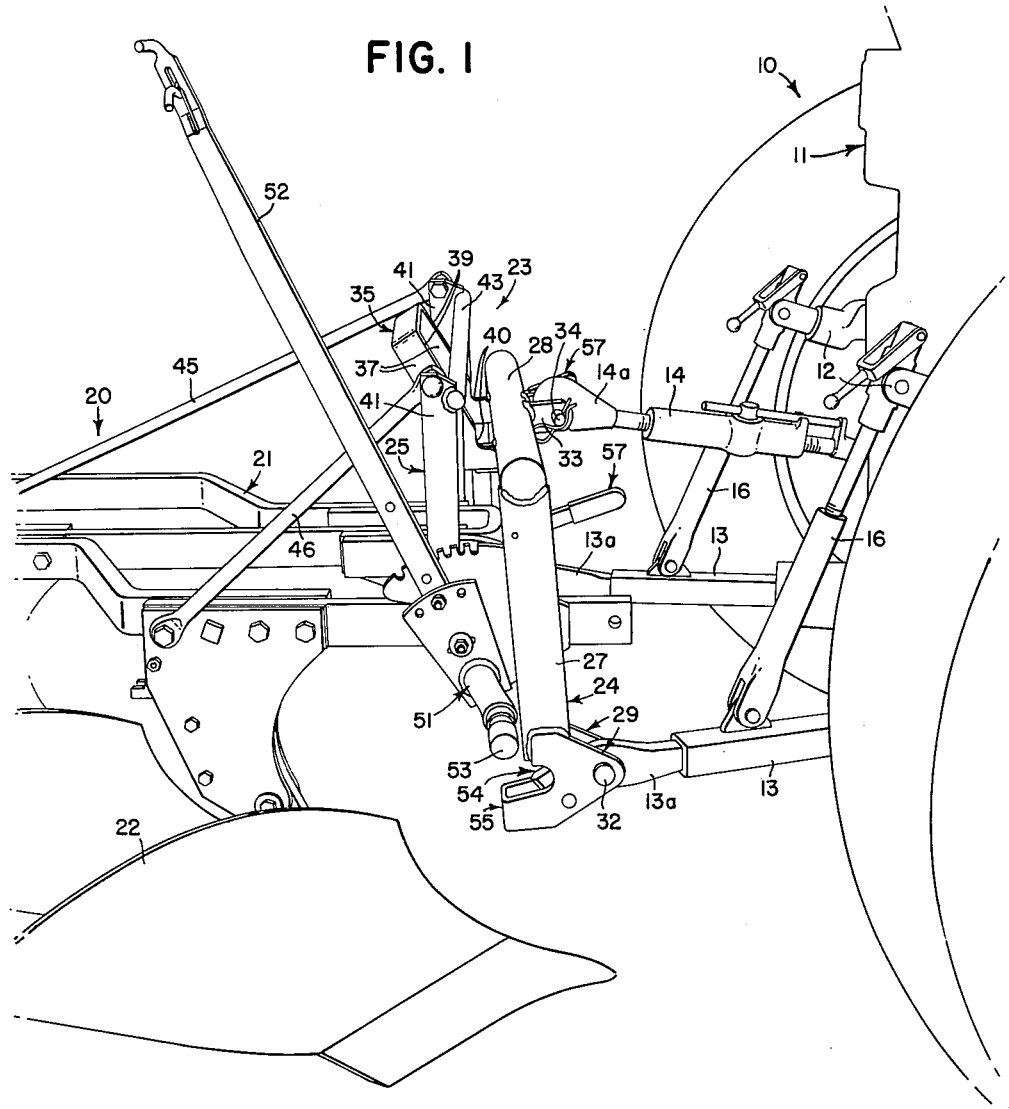
Fig. 1 is a perspective view of the forward portion of a multi-bottom plow and the rear portion of a tractor, with the hitch parts disposed in the position they occupy during the process of hitching the implement to the tractor.

Referring first to Fig. 1, the tractor is indicated in its entirety by the numeral 10 and includes the usual tractor construction, such as a power lift mechanism 11 carried at the rear portion of the tractor and including a pair of power actuated lift arms 12 connected to a pair of lower links 13 which, taken with an upper link 14, constitute the principal portion of the conventional three point hitch linkage with which many tractors today are equipped. The links 13 and 14 are connected at the forward ends with the rear portions of the tractor for both vertical and horizontal movement and the rear ends are provided with implement-connecting sections 13a and 14a that are apertured or otherwise formed to receive implements that are to be connected with the tractor. The lift arms 12 are connected with the lower link 13 through lift link units 16.

The implement chosen to illustrate the principles of the present invention is indicated in its entirety by the reference numeral 20 and is per se of conventional construction. The implement 20 includes a generally fore-and-aft extending frame 21 to which plurality of plow bottoms 22 are connected in the usual way.

The hitch means, which is of primary concern in the present invention, is indicated in its entirety by the reference numeral 23 and comprises a first hitch frame 24 carried by the rear end of the links 13 and 14, and a second hitch frame in the form of a generally vertical mast section 25 that extends generally vertically from the forward portion of the implement frame 21. The hitch frame 24 includes a transverse generally upwardly extending structure made up of a pair of laterally spaced side bars 27 connected together at their upper ends by a transversely extending pipe member 28 the ends of which are welded or otherwise fixed to the side members 27. The lower ends of the side members 27 are formed with apertured connectors 29 constructed and arranged to receive pins 32 by which the rear ends of the lower draft links 13 are swingably connected with the hitch frame 24. The generally central portion of the transverse pipe member 28 is formed with similar lugs 33 that also are apertured to receive a pin 34 of other suitable means by which the rear end of the upper link 14 is connected to the upper portion of the hitch frame 24. The generally central portion of the transverse pipe member 28 also carries a rearwardly and upwardly extending hook section 35 that is made up of a generally rectangular member having side portions 37 that are disposed in laterally spaced apart relation. The implement engaging hook section 35 has upwardly and rearwardly angled forward edges 39 and, at the lower portion thereof, socket sections 40 in which a portion of the implement mast section 25 is adapted to nest when the implement is completely connected in operative draft-transmitting relation with the tractor.

The implement hitch frame 25 comprises a pair of laterally spaced bars 41 that is secured in any suitable way to the forward portion of the implement frame 21 and extends generally upwardly therefrom. The mast bars 41 are interconnected by a transverse member 43 that is welded or otherwise firmly fixed to the upper ends of the side bars 41. Guide gussets 44 are welded to the upper portions of the bars 41 and the adjacent portion of the member 43. The implement hitch frame or mast section 25 also includes or is connected with rearwardly and downwardly extending reinforcing brace bars 45 and 46 connected at their rear ends with the implement frame and at their forward ends with the upper portions of the side members 41.

The implement mast section 25 is rigid with and, generally speaking, forms an integral part of the implement frame. The latter also includes at the forward portion thereof a transversely extending cross bar 51 that is mounted for rocking movement in the beams or bars making up the implement frame 21. A hand lever 52 is provided to secure the cross bar 51 in different positions of adjustment. The cross bar 51 has crank ends 53 that form laterally extending members and are adapted to be latchingly engaged with the lower portion of the hitch frame 24. To this end, a latch unit 54 is disposed at each side of the lower part of the hitch frame 24 and includes rearwardly opening socket means 55 into which the laterally extending portions 53 of the bar 51 are adapted to seat. As best shown in Fig. 3, latches 56 are disposed in the sockets 55 and are adapted to releasably engage the laterally extending bar portion 53, each latch being controlled by a hand lever 57. Any suitable latch mechanism may be provided, but preferably such construction includes the following mechanism.

As will best be seen from Figs. 3 et seq., each of the hitch frame bars 27 comprises a box section made up of front and rear walls 61 and 62, and side walls 63 and 64. Secured, as by welding, to each of the side walls 63 and 64 is a pair of socket plates 66 and 67 that make up the major portion of the socket member 55 of which the apertured connectors 29 form parts that receive the hitch pins 32. The rear portions of the plates 66 and 67 are notched to form the sides of the sockets 55. The lower portions of each pair of bracket plates 66 and 67 are also apertured to receive a cross pin 69 to which the associated latch member 56 is connected. Each member 56 comprises a rearward nose portion 71 and forward upstanding portion 72 that extends upwardly into the space in the lower portion of the associated box section 27. Between the sections 71 and 72, each latch member 56 is provided with a notch 73 shaped to receive the associated end portion 53a of the cross bar 51, as best shown in Fig. 2.

The latch units 54 are substantially identical and a detailed description of one will suffice. Each latch lever 56 is locked in bar-engaging position by a vertically movable locking block 75, the lower end of which is formed with a depending portion 76 that normally lies between the upper end of the latch section 72 and the lower end 62a of the associated rear wall 62, preventing the latch member 56 from swinging rearwardly in a counterclockwise direction as viewed in Fig. 3, thus holding the bar 51 engaged in draft transmitting relation with the lower of the hitch frame 24. A spring 78 is anchored at its upper end against an abutment 79 that is secured, by welding, to at least one of the side plates 63 and 64, and the lower end of the spring 78 seats in a notch 81 formed in the upper end of the locking block 75.

A detent arm 85 has a rearward portion of the upper end thereof apertured to receive a pin 86 by which the detent arm 85 is pivoted to the upper portion on the associated locking block 75. The forward portion of the detent lever or arm 85 is connected by means of a pivot 87 to the lower end of an upwardly extending link 88 disposed within the box section member 27, and the upper end of the link 88 is pivotally connected, as at 89, to the hand lever 57 that is pivoted, as at 92, to the upper portion of the member 27. In the normal locked position of the latch parts, as shown in Figs. 3 and 6, the detent arm 85 lies in between the locking block 75 and the adjacent side wall section 64, with the lower or narrowed portion 85a of the detent arm 85 disposed rearwardly of the upwardly extending latch section 72 of the latch member 56.

When it is desired to condition the latch units 54 for releasing the associated implement-carried bar 51, the operator, without dismounting from the operator station on the tractor, reaches down and pulls up on one of the hand levers 57. As will be seen from Fig. 3, the first effect on this movement is to swing the end 85a of the associated detent 85 in a counterclockwise direction (Fig. 3) about the pivot 86 as an axis until the lower end 85a engages the adjacent upstanding portion of the latch arm 72. This prevents any further swinging of the detent member 85 and as the operator continues to lift upwardly on the arm 57, both the detent 85 and the associated locking block 75 are raised bodily upwardly within the box section member 27 until the lower end of the detent arm section 85a moves into a position permitting the lower end to swing across the upper portion of the latch arm 72 and enter a shallow recess 95, the detent arm 85 then being substantially in a position slightly past the vertical, as shown in Fig. 4, which serves to hold the locking block 75 in an upper position, even when the operator releases his hold on the lever 91. In this position of the detent arm 85, the spring 79 acts through the block 75 and detent arm 85 to tend to hold the latch 56 in the position shown in Fig. 4. Thus, even after the operator has pulled up on the other lever 57, the latch members 56 are not permitted to immediately swing down into bar-releasing position. However, as soon as the implement is dropped to the ground and the tractor driven forwardly, the hitch frame 24 is pulled away from the implement and the two latch members 56 are swung into a bar-releasing position, Fig. 5, which is also a bar-receiving position, for as each latch member 56 swings into its bar-releasing position the nose portion 71 engages stop means that may be of any suitable construction but preferably takes the form of an abutment at the rear ends of the plates 66 and 67. The stop 98 is disposed so as to hold the latch member 56 in a position such that the latch section 72 lies underneath the lower end portion 76 of the locking block 75 and thus prevents the latter from moving downwardly under the action of the spring 78. In this position of the latch part 72, the latter also lies in front of the socket 55 and the nose portion 71 lies down in between the rear lower portions of the side plates 66 and 67. In this way, the latch parts are placed in a position to readily receive the implement-carried bar 51, whenever the hitch unit 24 is backed into an implement to again connect the latter to the tractor automatically.

Thus, as can be seen from Fig. 5, after the bar 51 is released from the tractor-carried hitch frame 24, by lowering the latter slightly, the upper hitch section 35 will drop down and be released from the implement-carried bar 43, after which the tractor may be driven away from the implement without requiring any further action on the part of the operator. It will be noted, however, that each latch member 56 is held in a position accommodating a reconnection of the implement cross bar 51 with the tractor carried hitch frame 24, whenever the cross bar 51 is brought up against the upper arms 72 of the latch members with a force sufficient momentarily to raise the locking blocks 75 until the latch arms 72 reach the position shown in Fig. 3, after which the springs 78 then become available to immediately shift the locking blocks 75 downwardly into a position locking the latch members 56 in their bar-engaging draft transmitting relation, as shown in Fig. 3.

From Fig. 1 it will be observed that the implement-engaging hook section 35 extends rearwardly of the latching mechanism 54. Hence, when the tractor is backed into initial engaging position with the implement with the links 13 and 14 lowered, the hook section 35 passes in between the side members 41 and the forward edges 39 are disposed underneath and behind the bar 43. The tractor power lift unit 11 is then operated to raise the links 13 and 14, thus raising the hitch frame 24. The upward movement of the latter hooks the section 35 into the upper portion of the implement mast section 25, guided into the proper position laterally by the guide gussets 44 and the side portions 37, and thus begins to raise the forward portion of the implement. Since the implement is lifted from a point ahead of the center of gravity the weight of the implement causes the lower crossbar 51 to move forward against the rear edges of the side members 27 of the hitch frame 24. As the raising action is continued, the upper bar 43 slides downwardly into the socket portions 40 and at the same time the laterally extending bar sections 53 slide downwardly along the rear edges of the side members 27 into positions where they enter the sockets 55. As the sections 53 move into seating relation with the associated sockets 55, the latches 56 automatically snap into locking position as described above in detail, thus completing the connection of the implement to the tractor-carried hitch frame 24 in draft-transmitting relation, the bar 43 then fully seating in the upper socket portions 40.

After the latches 56 are in positions locking the cross bar 51 to the lower portion of the hitch frame 24 the implement is firmly and securely connected with the tractor but at the same time the full advantages of the Ferguson three link hitch system are retained, the implement being capable of lateral as well as vertical swinging movement relative to the tractor in substantially the same way as if connected directly to the rear ends of the link 13 and 14 in the usual way by manually inserted pins or the like, yet according to the present invention, the entire connecting operation is effected from the operator's station on the tractor simply by operating the tractor power lift mechanism 11 to raise and lower the links 13 and 14.

According to the present invention it is not necessary to align the tractor and the implement with extreme accuracy before affecting the desired connection. All that it is necessary to do to bring the hook section 35 in between the side portions 41 far enough to engage the upper portion in behind the bar 43. If the tractor is offset laterally to one side or the other the implement is automatically brought substantially to the desired relative position when the forward portion of the implement is raised by the raising of the lower links 13 and the hitch frame 24. Thus, bringing the implement to the proper position is automatically effected even though one end 53 of the cross bar 51 initially engages the associated hitch frame 24 before the other portion 53 engages the hitch frame, and as the front end of the implement is raised, the implement, even though it be quite heavy, is automatically shifted into a position to permit the portions 53 to be latched to the lower portion of the tractor-carried hitch frame 24. This is due, at least partially, to the fact that the hook portion 35 first engages the forward portion of the implement at a point generally above and forward of the center of gravity of the implement as a whole.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. The combination with a tractor having a three-point hitch linkage, of a generally vertical adapter frame having at its upper and lower portions means receiving the rear ends of the upper and lower links of said linkage and a pair of generally rearwardly facing notches, a rearwardly and upwardly extending hook portion at the upper part of the adapter frame, and an implement comprising an implement frame having at its forward portion an upwardly extending mast section including a hook-receiving portion at the upper part of the mast section, means on the lower forward portion of the implement forming laterally outwardly extending frame-engaging means adapted to engage said adapter frame above the lower forward part when the hook portion first engages the implement, and latch means at the lower part of said adapter frame adapted to receive said frame-engaging means and hold the latter in said notches.

2. For use with a tractor of the three-point hitch type having upper and lower power operated generally rearwardly extending hitch links adapted to receive an implement to be connected in draft-transmitting relation with the tractor through said links, the improvement comprising an implement mast section adapted to be attached to the forward end of the implement, generally transversely extending means carried adjacent the lower part of said mast section, a hitch frame section carrying means to pivotally receive the rear ends of said links, a mast engaging and lifting means carried by the upper portion of said hitch frame section in vertically fixed relation relative to the hitch frame section and extending upwardly and rearwardly therefrom so as to engage and interlock with the upper portion of said mast section by virtue of upward movement of the hitch frame section relative to the implement mast section, whereby raising said links with said mast lifting means engaged with said mast section serves to raise the forward portion of the implement and cause the transversely extending means at the lower part of said mast section to move toward the hitch frame section, and latch means carried by the lower portion of the hitch frame to receive said transversely extending means and lock the latter to said hitch frame section.

3. For use with a tractor of the three-point hitch type having upper and lower power operated generally rearwardly extending hitch links adapted to receive an implement to be connected in draft-transmitting relation with the tractor through said links, the improvement comprising an implement mast section adapted to be attached to the forward end of the implement and having laterally spaced apart side members, generally transversely extending means carried adjacent the lower part of said mast section, a hitch frame section carrying means to pivotally receive the rear ends of said links, a mast engaging and lifting hook means carried by the upper portion of said hitch frame section and extending upwardly and rearwardly therefrom so as to pass in between said side members in guided relation and engage and interlock with the upper portion of said mast section, whereby raising said links with said mast lifting means engaged with said mast section serves to raise the forward portion of the implement and cause the transversely extending means at the lower part of said mast section to move toward the hitch frame section, and latch means carried by the lower portion of the hitch frame to receive said transversely extending means and lock the latter to said hitch frame section, said hook means being spaced from said latch means so that when said links are raised initial engagement between said hook means and the upper portion of the mast section takes place before said transversely extending means on said mast section interlocks with said latch means.

4. A hitch device for connecting an implement to a tractor having an upper hitch link and a pair of laterally spaced apart lower hitch links, said links being attached for universal movement relative to the tractor and the latter having power operated means for raising and lowering the lower hitch links, said hitch device comprising a generally vertical hitch frame adapted to pivotally receive the rear end portions of said upper and lower links, whereby raising and lowering of the lower links serve to raise and lower said frame, implement engaging means carried by the upper portion of said hitch frame and disposed in an upwardly and rearwardly angled position, whereby the hitch frame may be moved into implement-engaging position after which raising said hitch frame serves to raise the fore part of the implement and draw the implement forwardly toward said hitch frame, laterally outwardly extending latch-engaging means carried by the implement below the upper forward portion thereof and spaced so as to engage side portions of said hitch frame when said implement engaging means first raises the implement and draws the same forwardly, socket means carried by said hitch frame below said hitch frame side portions to receive said laterally outwardly extending means, and latch means carried by the lower portion of said hitch frame and operable to lock said outwardly extending means in said socket means, serving thereby to connect the implement with said hitch frame in draft-transmitting relation.

5. For use with a tractor of the three-point hitch type having upper and lower generally rearwardly extending hitch links adapted to receive an implement to be connected in draft-transmitting relation with the tractor through said links, and power operated means to raise and lower said links, the improvement comprising an implement mast section adapted to be attached to the forward end of the implement and having laterally spaced apart side members, generally transversely extending means carried adjacent the lower part of said mast section, a hitch frame section carrying means to pivotally receive the rear ends of said links, a mast engaging and lifting means carried by the upper portion of said hitch frame section and extending upwardly and rearwardly therefrom so as to pass in between said side members in guided relation and engage and interlock with the upper portion of said mast section, whereby raising said links with said mast lifting means engaged with said mast section serves to raise the forward portion of the implement and cause the transversely extending means at the lower part of said mast section to move toward the hitch frame section, a pair of laterally spaced apart generally vertically extending side members adjacent the lower portion of the hitch frame section to receive said transversely extending means, socket means on the hitch frame section adjacent the lower portions of said side members to receive said transversely extending means, and latch means carried by the lower portion of the hitch frame to lock said transversely extending means to said hitch frame section.

6. For use with a tractor of the three-point hitch type having upper and lower generally rearwardly extending hitch links adapted to receive an implement to be connected in draft-transmitting relation with the tractor through said links and power operated means connected to raise and lower said links, the improvement comprising an implement mast section adapted to be attached to the forward end of the implement, generally transversely extending means carried adjacent the lower part of said mast section, a hitch frame section carrying means to pivotally receive the rear ends of said links, a mast engaging and lifting means carried by the upper portion of said hitch frame section and extending upwardly and rearwardly therefrom so as to engage the upper portion of said mast section, socket means at the lower portion of said upwardly and rearwardly extending means to receive and interlock with said upper portion of the mast section, said hitch frame means having generally vertical sections adjacent the lower portion of said hitch frame means to abuttingly receive the end portions of said transversely extending means when the mast engaging and lifting means first engages and lifts the forward portion of the implement mast section, said transversely extending means being movable downwardly along said vertical sections as continued lifting effort is exerted by said hitch frame on said implement mast section and said upper portion of the mast section moves downwardly toward said socket means, and latch means carried by the lower portion of the hitch frame below said vertical sections to receive said transversely extending means and lock the latter to said hitch frame section when said upper portion of the mast section seats in said socket means.

7. For use with a tractor of the three-point hitch type having upper and lower power operated generally rearwardly extending hitch links adapted to receive an implement to be connected in draft-transmitting relation with the tractor through said links, the improvement comprising an implement mast section connected to the forward end of the implement and including an upper transverse part and a transversely extending means carried adjacent the lower portions of said mast section, a hitch frame section carrying means to pivotally receive the rear ends of said links, a mast engaging and lifting means carried by the upper portion of said hitch frame section and including upwardly and rearwardly extending means to engage and raise said upper transverse part and the implement mast section when said hitch links are raised, whereby raising said links with said mast lifting means engaged with said mast section serves to raise the forward portion of the implement and cause the transversely extending means at the lower part of said mast section to move toward the hitch frame section, generally vertical rearwardly facing portions on said hitch frame spaced apart laterally to receive said transversely extending means when said mast engaging and lifting means first engages the transverse part of said mast section and starts to raise the latter, and latch means carried by said hitch frame section below the rearwardly facing generally vertical portion of the hitch frame means to engage said transversely extending means when the latter moves downwardly from said rearwardly facing portions.

8. The invention set forth in claim 7, further characterized by said latch means including parts movable into a mast-releasing position, and biased means acting against said parts for releasably holding them in said mast-releasing position.

9. The invention set forth in claim 8, further characterized by means incorporated in said latch means for releasing said biased means in response to movement of said transversely extending means thereagainst.

10. The invention set forth in claim 7, further characterized by said latch means including socket means extending rearwardly and facing generally upwardly so as to be in a position to receive said transversely extending means, and keeper means pivoted to said socket means and engageable with said transversely extending means to secure the latter in said socket means.

11. The invention set forth in claim 10, further characterized by said keeper means including an upstanding portion, a generally vertically movable block portion carried by said hitch frame and shiftable into a position engaging said upstanding portion for holding the keeper means against pivotal movement relative to the hitch frame, and releasable detent means carried by the hitch frame for optionally holding said keeper means in a latch-releasing position.

12. The combination with a tractor having power-operated elevatable hitch means, and an implement having a generally fore-and-aft extending frame, of an upper pair of interengageable parts, one carried by an upper portion of the hitch means and the other carried by the upper portion of the implement, a lower pair of interengageable parts, one carried by the lower portion of the hitch means and the other carried by the lower portion of the implement, the upper implement-carried part being located forward of the center of gravity of the implement, the upper hitch-carried part extending upwardly and rearwardly so that when the hitch means is elevated the upper pair of parts come into engagement before the lower pair of parts come into engagement and the upper hitch part acts to raise the implement and draw the implement toward the tractor, and latch means on the lower portion of one of said elevatable hitch means and said implement and engageable with the other of said hitch means and implement upon the occurrence of the aforesaid movement of the implement toward the tractor for holding the implement connected with said hitch means.

References Cited in the file of this patent

UNITED STATES PATENTS

| | | |
|---|---|---|
| 2,325,869 | Mosling | Aug. 3, 1943 |
| 2,702,501 | Simpson | Feb. 22, 1955 |
| 2,707,643 | Nelson | May 3, 1955 |
| 2,710,569 | Altgelt | June 14, 1955 |
| 2,732,784 | Tanke et al. | Jan. 31, 1956 |
| 2,888,995 | Sorensen | June 2, 1959 |

FOREIGN PATENTS

| | | |
|---|---|---|
| 59,731 | France | Feb. 17, 1954 |

(Addition to No. 1,014,471)